United States Patent [19]

Hackstein et al.

[11] 4,022,865
[45] May 10, 1977

[54] PROCESS FOR WORKING UP BLOCK SHAPED GRAPHITE FUEL ELEMENTS

[75] Inventors: Karl-Gerhard Hackstein; Gerhard Spener, both of Hanau, Germany

[73] Assignee: HOBEG Hochtemperaturreaktor-Brennelement GmbH, Hanau, Germany

[22] Filed: May 13, 1975

[21] Appl. No.: 577,104

[30] Foreign Application Priority Data

May 15, 1974 Germany .................. 2423611

[52] U.S. Cl. .................. 423/4; 176/90;
144/193 R; 225/97; 241/27; 252/301.1 R
[51] Int. Cl.² .............. C01G 113/00; G21C 19/36;
G21C 19/44
[58] Field of Search .................. 423/4; 176/90;
252/301.1 R; 241/27; 144/3 K, 193 R;
225/97, 103, 104

[56] References Cited

UNITED STATES PATENTS

| | | | |
|---|---|---|---|
| 1,630,759 | 5/1927 | Pierce | 225/103 X |
| 2,764,239 | 9/1956 | Selby | 225/103 X |
| 3,353,929 | 11/1967 | Kracke et al. | 423/4 |
| 3,413,196 | 11/1968 | Fortescue et al. | 176/73 |
| 3,415,911 | 12/1968 | Lloyd | 176/90 X |
| 3,714,323 | 1/1973 | Dolci et al. | 423/4 |
| 3,756,786 | 9/1973 | Tillessen et al. | 423/4 |
| 3,808,320 | 4/1974 | Kaiser et al. | 423/4 |
| 3,891,502 | 6/1975 | Hackstein et al. | 176/71 |

FOREIGN PATENTS OR APPLICATIONS 1,379,741 10/1964 France

Primary Examiner—Edward A. Miller
Attorney, Agent, or Firm—Cushman, Darby & Cushman

[57] ABSTRACT

There is provided a process for recovering block shaped graphite fuel elements made of a graphite block with a parallel cooling channel and which block contains the fuel arranged in separate zones. The process is especially useful for such fuel elements in which the cooling channels and the fuel zones are distributed in a screenlike manner adjacent to each other and wherein these fuel elements are first comminuted mechanically and then are reconditioned by burning and wet chemical separation into fissile material and waste material. For the mechanical comminution of the graphite block conical pins (or mandrels) are simultaneously pressed into several cooling channels until the block is broken apart along the entire length of these cooling channels.

9 Claims, 4 Drawing Figures

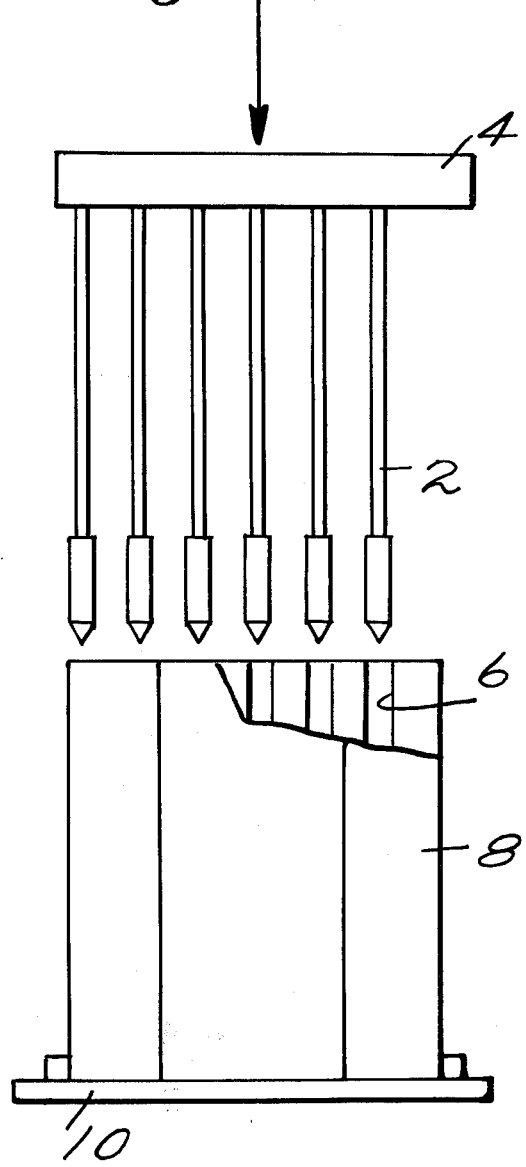
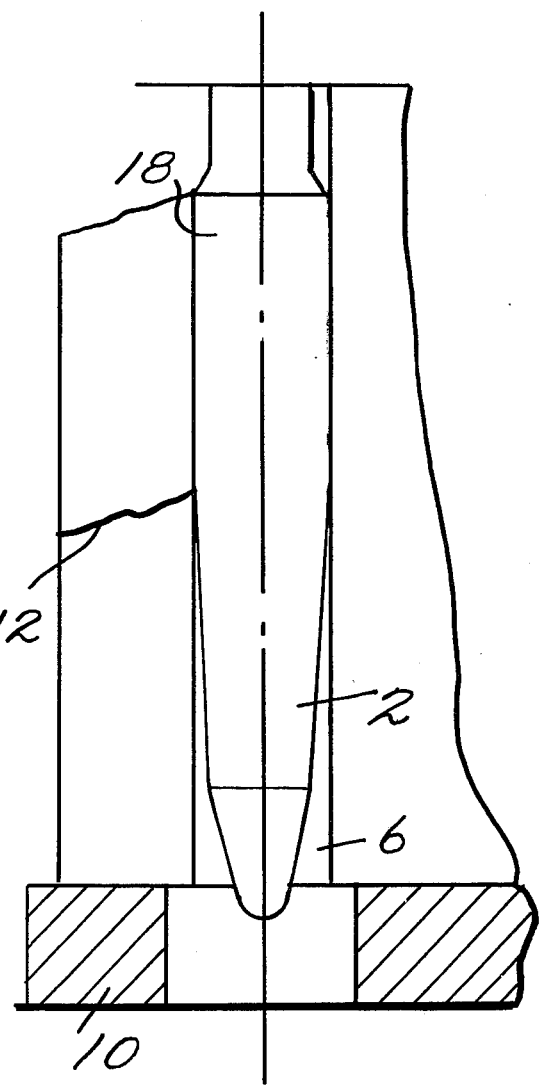
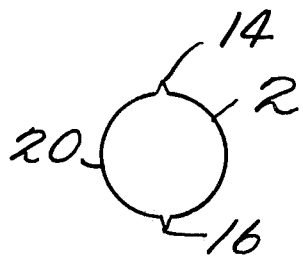
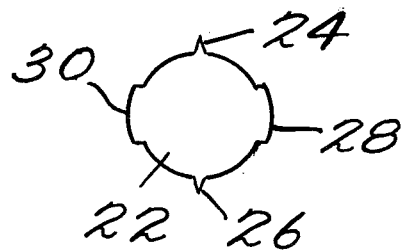

PROCESS FOR WORKING UP BLOCK SHAPED GRAPHITE FUEL ELEMENTS

The invention is directed to a process for recovering unirradiated and irradiated block shaped graphite fuel elements which are built up from a graphite block with parallel cooling channels and fuel zones whereby the fuel elements are first comminuted (disintegrated) mechanically and then are reconditioned by burning and wet chemical working into fissile material and waste material.

Block shaped graphite fuel elements are used in gas cooled high temperature reactors. There are preferably used fuel elements which contain fertile material and fissile material adjacent to each other in separated fertile and fissile fuel particles, either mixed in common fuel zones or separated into parallel fertile and fissile fuel zones in the same fuel element.

Block shaped fuel elements for high temperature power reactors are prismatic graphite blocks having a height of, for example, 40 to 100 cm and are of hexagonal or pentagonal cross section with a diameter of 30 to 60 cm in the most commonly used configuration the blocks are permeated by a screen shaped arrangement of 40 to 100 parallel cooling channels having a diameter of about 1 to 2 cm and 80 to 250 cylindrical fuel zones having a diameter of about 0.7 to 2 cm. In another configuration the blocks contain cylindrical or hollow cylindrical fuel inserts in channels having a diameter of about 6 to 10 cm diameter, in which channels cooling gas flows around the inserts either in the annular gap between the inserts and the channel wall or in this ring gap and additionally in the central channel. The fuel zones or fuel inserts contain the fuel in the form of coated particles embedded in a carbon or graphite matrix. The coated particles are generally spherical uranium or thorium oxide or carbide particles having a diameter of 150 to 800 m$\mu$ diameter which are coated with several layers of pyrolytic carbon and, in a given case (optionally) an intermediate layer of SiC.

Besides the known construction of a fuel element as a prefabricated graphite block which contains filled fuel bodies in the fuel channels as shown for example in Fortescue U.S. Pat. No. 3,413,196 there are also known block fuel elements, see Hrovat German Pat. No. 1,902,994, which are molded from a graphite molding composition containing fuel free zones or fuel containing zones and hardened by a temperature treatment.

The working up of such fuel elements after the radiation is to recover the unconsumed or fertilized fissile material. In the first step of the working up the fissile material must be separated from the large amount of carbon in which it is embedded. It is known for example from German Pat. No. 1,961,145 and corresponding Tillessen U.S. Pat. No. 3,756,786 to burn the fuel elements as such to further treat the remaining ash chemically in order to separate the fissile materials Uranium 234, Uranium 233 and Plutonium 239. However, the burning of entire block fuel elements is undesirable because they only have a small surface per unit weight and the burning only progresses slowly. Therefore processes are known in which the block fuel elements first are comminuted in crushers and mills. However in such processes there cannot be avoided injury to a part of the particles in the comminution (disintegration) of the fuel zones. This is especially disadvantageous if separated fertile particles and fissile particles are present which should be separated subsequently in the burning process by their different jacketing with and without a SiC intermediate layer, since the SiC jacket must remain intact in order that the SiC coated particles are not dissolved in leaching the ashes but only after the subsequent separation are comminuted and then dissolved. However there occurs a mixing of both types of particles through the injury to the SiC jacket in the precomminution of the elements.

Therefore, in the past there have been numerous searches to find a safe and simple method for preparation of irradiated fuel elements. For example, it is known from Nukem Belgian Pat. No. 785,841 and corresponding U.S. Application Ser. No. 277,050 of Hackstein filed Aug. 1, 1972 and now U.S. Pat. No. 3,891,502 to arrange fertile and fissile fuel materials in zones in the block fuel element in order that by mechanical separation, for example with crown borers, the fertile zones can be separated from the fissile zones which can be respectively worked up. This zonal distribution, however, is not optimal neutron physically for the reactor layout and the dust producing bores require special expense in hot cells.

The problem of the invention therefore was to find a simple process for the disintegration or communition and further processing of irradiated and unirradiated graphite block fuel elements, especially block fuel elements, which besides the parallel running cooling channels contain fuel zones in a screen shaped arrangement. This process should be suited especially for use in hot cells and besides the fuel zones should not be comminuted and become mechanically stressed so that in a given case a separate separation of the fertile zones and fissile zones is possible.

This problem has been solved according to the invention in reprocessing block shaped fuel elements which are made of a graphite block with parallel cooling channels and contain the fuel material arranged in separate zones and which are mechanically comminuted before the burning of the graphite portion and the wet chemical separation by carrying out the mechanical comminution by simultaneously pressing into several cooling channels of the graphite block conical pins (or mandrels) until the block is broken apart along the entire length of these cooling channels.

The disintegration method of the invention uses the brittleness of the graphite which, as is true of all porous ceramic articles, has a considerably lower tensile strength than resistance to pressure and therefore can be easily split with formation of separating cracks by tensile stress, especially by a wedge type action.

The cleavage at specified separating surfaces, namely at the thinnest places between two cooling channels according to a specific form of the invention can be advantageously promoted if there is used a pin which has axially running ribs. By different widths of the rib points such a rib can exert either a greater separating action by notching or instead can exert a pressure effect perpendicular to the surface of separation. Preferably two opposed ribs arranged on a pin always exert influence as a pair on the wall of the cooling channel, one providing the notching of the cooling channel wall and the other rib applying pressure to the cooling channel wall perpendicular to the surface of separation.

It has proven especially effective for the separating action if the angle of inclination of the conical pins is 0.5° to 5° and if several rigidly connected pins are simultaneously introduced into several cooling channels and are pressed into the block element until the corresponding piece of the block is split along its entire length. It is of especial advantage to simultaneously press a corresponding row of pins into all of the cooling channels of the entire width of the block which are on a screen row line. In a given case there can be simultaneously pressed into several rows of adjacent cooling channels the corresponing rows of pins whereby advantageously each adjacent row of pins is displaced somewhat in height, so that each series of pins sinks in from the outside inwardly respectively somewhat later in the respective series of cooling channels and therefore the series is subjected to pressure in succession and broken apart. Through the ribs which are on the pins this pressure is not applied simultaneously to the entire circumference and small deviations in the screen arrangement of the cooling channels which result from the production tolerances are equalized without requiring considerable twisting strengths on individual pins of a series of pins.

If the block consists of a type of graphite which breaks up with very irregular separatory surfaces in the pressing in of the pins, there are preferably used relatively short pins with an angle of inclination of 5° to 15° on account of the non-uniform strengths which are caused by the subsequent pressures in the irregular parts of the cooling channels remaining in the breaking up.

The block fuel elements which consist of graphite blocks and fuel rods inserted in fuel channels break up by pressing the pins into the graphite block in such a manner according to the invention that the fuel rods are exposed but are not injured. Preferably fuel rods are now either individually picked out of the broken graphite pieces with a manipulative device and separated or they are separated in rows with an apparatus either semi automatically of fully automatically by tilting of the elements on a gridiron and still solidly adhering rods with paring knives from the graphits.

It is especially advantageous if fuel rods with fertile materials in this manner are separated from those with fissile material which are present besides the fuel rods with fertile materials in the screen arrangement and the fertile and fissile rods separately further reprocessed. This has the special advantage that a mixture of fertile and fissile materials is out of the question without requiring the separate particles to receive different coatings. Even in the event of particle damage in the reactor operation there can take place a 100° separation into fertile and consumable material.

The comminution of the graphite block fuel element by the process of the invention using the pressing of pins into the cooling channels is also advantageous with elements which contain the fuel in cylindrical or hollow cylindrical fuel inserts whereby the fuel inserts are arranged in the cooling channels and is directly flowed around by cooling gas. In the reprocessing of these elements after the withdrawal of the fuel inserts from the cooling channels the conical pins of the invention are simultaneously pressed into several cooling channels and the graphite block thereby comminuted stepwise with simple means. The process of the invention eliminates the use of a large jaw crusher for the comminution of the radioactive graphite blocks in the hot cells, which is of considerable advantage because of space in the hot cells and also on account of the easier possibility of decontamination. Also for this type of block element a breaking along the entire screen row of the cooling channels is to advantageous, especially several screen series with delayed pressure demands for each individual row.

The invention is illustrated in the drawings wherein

FIG. 1 is a front view partially broken away showing the position of the conical pins just prior to entering cooling channels;

FIG. 2 is a top view of one of the channels after the pin has entered the block;

FIG. 3 is a cross sectional view of one type of conical pin; and

FIG.4 is a cross sectional view of another embodiment of a pin.

Unless otherwise indicated all parts and percentages are by weight.

EXAMPLE

An irradiated hexagonal block fuel element having a height of 793 mm and a width over the flats of 360 mm contained in a hexagonal screen arrangement 66 cooling channels having diameters of 21 mm each with 40 mm intervals between the screens, whereby each cooling channel was surrounded by six fuel channels having a diameter of 16 mm. The fuel rods contained in the fuel channels had embedded in a carbon matrix mixed $ThO_2$-fuel particles (coated only with pyrolytic carbon) and $UO_2$ consumable (fissile) particles (coated with pyrolytic carbon and SiC) in a Th/U ration of 10:1. The block was so placed on a 2 cm thick underlying plate that there were provided in the underlying plate bores having a diameter of 25 mm and arranged for passage therethrough of pins under each of the 17 screen series of three to six cooling channels of the blocks. The block and plate were so inserted into a 25 metric ton press that in the lowering of the upper die of the press a series of six pins having an angle of inclination of 1° fastened to the upper die sank into a row of cooling channels. Pieces broke off from the block fuel element along row channels during further introduction of the pins until the pins passed through. With the help of a curved spatula the free lying, only weakly adhering fuel rods could be removed from the open fuel channels and separated from the pieces of graphite. This process was repeated for row after row until the entire block was disintegrated. The collected graphite pieces were comminuted to a particle size of about 3 mm and then burned in a fluidized bed furnace with nitrogen containing oxygen at about 1200° C. The fuel rods were next burned in a shaft furnace and the remaining fuel particles still provided with residual pyrolytic carbon layers subsequently burned in a fluidized bed furnace.

In the subsequent dissolving in concentrated nitric acid with addition of hydrofluoric acid the SiC coated fissile particles not attacked by the burning remained behind and were comminuted in a hammer mill, the carbon portion burned in a fluidized bed furnace and prepared for dissolution in acid.

Since the fuel rods were not mechanically stressed in the comminution process, in the separation of the fuel and fissile particles there was obtained practically a 100% separation.

The process can comprise, consist essentially of or consist of the steps set forth.

What is claimed is:

1. In a process for recovering block shaped graphite fuel elements made of a graphite block with parallel cooling channels, said block containing the fuel arranged in separate zones, wherein the fuel elements are first comminuted mechanically and then are reconditioned by burning the carbon and wet chemical separation into fissile material and waste material the improvement comprising carrying out the mechanical comminution of the graphite block by simultaneously pressing conical pins into several cooling channels and continuing penetrating into the cooling channels until the block is broken apart along the entire length of the penetrated cooling channels.

2. The process of claim 1 wherein the cooling channels and fuel zones of the fuel elements are distributed in a screenlike manner adjacent to each other.

3. The process of claim 1 wherein the pins have axially running ribs and there is exerted further separating pressure by said ribs.

4. The process of claim 3 wherein the ribs are arranged in pairs opposed to each other on the pin and one of the pair of ribs makes a notch in the cooling channel wall at the surface of separation and the other rib applies pressure to the cooling channel wall perpendicular to the surface of separation.

5. The process of claim 2 wherein the pins are arranged in at least one screen row corresponding to the screen arrangement of the cooling channels.

6. The process according to claim 1 wherein the conical pins have an angle of inclination of 0.5° to 15°.

7. The process of claim 6 wherein the angle of inclination is 0.5° to 5°.

8. The process of claim 7 wherein the angle of inclination is 5° to 15°.

9. The process of claim 2 wherein the conical pins have an angle of inclination of 0.5° to 15°, the block is broken along a screen row of cooling channels and after said breaking residual graphite attached to the fuel rod is removed by a bent spatula.

* * * * *